(12) United States Patent
Winn (10) Patent No.: US 10,891,318 B2
(45) Date of Patent: Jan. 12, 2021

(54) TEMPORAL LOGIC FUSION OF REAL TIME DATA

(71) Applicant: Andrew K. Winn, North Charleston, SC (US)

(72) Inventor: Andrew K. Winn, North Charleston, SC (US)

(73) Assignee: United States of America as represented by the Secretary of the Navy, Washington, DC (US)

(*) Notice: Subject to any disclaimer, the term of this patent is extended or adjusted under 35 U.S.C. 154(b) by 120 days.

(21) Appl. No.: 16/282,378

(22) Filed: Feb. 22, 2019

(65) Prior Publication Data

US 2020/0272641 A1 Aug. 27, 2020

(51) Int. Cl.
*G06F 17/00* (2019.01)
*G06F 7/00* (2006.01)
*G06F 16/28* (2019.01)
*G06F 16/2455* (2019.01)

(52) U.S. Cl.
CPC ........ *G06F 16/285* (2019.01); *G06F 16/2455* (2019.01)

(58) Field of Classification Search
CPC ............................ G06F 16/285; G06F 16/2455
USPC ......................................................... 707/737
See application file for complete search history.

(56) References Cited

U.S. PATENT DOCUMENTS

| 4,975,961 A * | 12/1990 | Sakoe | G06N 3/04 704/232 |
| 5,839,103 A * | 11/1998 | Mammone | G10L 17/10 704/232 |
| 6,519,561 B1 * | 2/2003 | Farrell | G10L 15/07 704/232 |
| 6,728,674 B1 * | 4/2004 | Griniasty | G10L 15/144 704/250 |
| 7,500,266 B1 * | 3/2009 | Vukelich | H04L 63/1416 726/23 |

(Continued)

OTHER PUBLICATIONS

Kong, Z. et al., "Temporal Logics for Learning and Detection of Anomalous Behavior", IEEE Transactions on Automatic Control, 62(3), pp. 1210-1222, Mar. 2017.

*Primary Examiner* — Pavan Mamillapalli
(74) *Attorney, Agent, or Firm* — Naval Information Warfare Center, Atlantic; Kyle Eppele; J. Eric Anderson (57) ABSTRACT

A method for temporal logic fusion can include steps of: receiving a plurality of inputs for a plurality of behavior classes, the inputs consisting of single- or multi-dimensional states sampled over time; computing a distance metric pairwise among the inputs, the computing being performed using dynamic time warping; mapping the high-dimension input signals into a 2-dimensional (2-D) space using t-distributed Stochastic Neighbor Embedding, the pairwise computation from the computing step being used as the distance metric required to perform this mapping; clustering the high-dimension input signals in the 2-D space via a k-means clustering algorithm; generating a signal temporal logic (STL) expression that distinguishes between a cluster in a behavior class and all high-dimension input signals not in that behavior class; and repeating the generating step for each cluster in that behavior class. The resulting STL expressions are combined via an "or" operator in Inference Parametric Signal Temporal Logic (iPSTL).

15 Claims, 2 Drawing Sheets

(56) References Cited

U.S. PATENT DOCUMENTS

| | | | |
|---|---|---|---|
| 9,754,580 B2* | 9/2017 | Weissberg | G10L 15/12 |
| 10,414,395 B1* | 9/2019 | Sapp | G01S 7/412 |
| 2005/0232096 A1* | 10/2005 | Van Helvoirt | G11B 21/106 |
| | | | 369/44.25 |
| 2009/0300769 A1* | 12/2009 | Srinivasa | H04L 63/1416 |
| | | | 726/26 |
| 2010/0257092 A1* | 10/2010 | Einhorn | G06Q 40/025 |
| | | | 705/38 |
| 2016/0028750 A1* | 1/2016 | Di Pietro | H04W 12/1202 |
| | | | 726/23 |
| 2018/0324199 A1* | 11/2018 | Crotinger | G06F 16/248 |

* cited by examiner

TEMPORAL LOGIC FUSION OF REAL TIME DATA

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Atlantic, Code 70E00, 1 Innovation Drive, Hanahan, S.C., 29410-4200; telephone (843) 218-3495; email: ssc_lant_T2@navy.mil, referencing 107820.

FIELD OF THE INVENTION

The present invention pertains generally to methods for detecting anomalies in large sets of data. More particularly, the invention pertains to methods for detection of anomalies in large sets of data using signal temporal logic (STL). The invention is particularly, but not exclusively, useful as a method for detection of anomalies in large sets of data using signal temporal logic (STL) in conjunction with clustering techniques, rather than trying to learn a single monolithic temporal logic expression, in order to distinguish different classes of behaviors.

BACKGROUND OF THE INVENTION

Historically, analysts have been presented with the difficult task of comparing incoming data with historical data to determine if the observed behavior belongs to specific class of behavior, such as being anomalous, or if the incoming behavior is indicative of future anomalous behavior. The difficulty of this task can be exacerbated as the amount of data to be compared can increase at an exponential rate. A particularly active related research field can be that of anomaly detection techniques for computer and network systems, commonly with the aim of identifying intruders and attacks.

One class of methods that identify deviations from normal behavior as known in the prior art can be that of statistical anomaly detection systems. These systems can track a variety of metrics describing the behavior/activity and can specify a statistical range of normal values. If any activity causes a metric to leave the normal range, an alert can be raised. While some of these methods have been shown to work well for specific types of anomalies, they can require the tracked metrics and normal ranges to be pre-specified and pre-defined. This can require an expert to setup the system, which can limit the general applicability if the expert is not present and/or available. Further, since these approaches can use only the current state of system, the time dependence between current and previous activities can be lost; it is this time dependence between current and previous activities which could be valuable to the anomaly detection process. Finally, these approaches can assume that behavior that is considered and defined as "normal" for the system will remain static over time, and will require modifications over time if this assumption does not hold.

A second prior art class of methods that can identify deviations from normal behavior can be that of machine learning based anomaly detection methods. These approaches can learn from historical data to determine functions that can distinguish normal behavior from anomalous behavior. Bayesian networks can be used to encode probabilistic relationships among variables of interest in order to identify anomalies, but these networks can have the same classification ability as the prior threshold based methods, and the structure can make it difficult to incorporate additional information.

A third class of prior art methods for detecting anomalies in datasets can be that of data mining based methods. Whereas the prior machine learning approaches aims to directly specify normal and anomalous behavior, data mining can work indirectly to uncover patterns, associations, changes, anomalies, and statistically significant structures and events in data. A variety of classification techniques have been used in this data mining approach. For example, neural networks have shown some promising results. However, neural networks can be slow and expensive to train, and neural network performance can depend on the choice of attributes to learn from, as well as the choice of a neural network complexity that is neither too simple nor too complex.

All of the above-cited prior art methods can use propositional logic, which can generally be thought of herein as logic statements connected by a logic connector, which can make the statements true or false. Signal Temporal Logic (STL) can extend the propositional logic used in many of the prior approaches that are described above with temporal operators. These operators can allow rules to be written that can require that some proposition is always true within a time frame, or that some proposition eventually becomes true within a time frame, or further that some proposition is true until some event occurs. Combining STL operators with propositional logic operators can allow one to describe behaviors with complex temporal inter-dependence succinctly. It is likely that what distinguishes anomalous behavior from normal behavior is not just what a given entity is currently doing, but also what that entity and other entities have done in the recent past.

In view of the above, it can be an object of the present invention to a system and method for detection of anomalies that can incorporate STL to fuse temporal operators with traditional logic operators to detect anomalies. Another object of the present invention can be to provide a system and method for detection of anomalies using STL, which can determine the degree to which a behavior satisfies a specification with a greater degree of confidence and more robustness, when compared to prior art methods. Still another object of the present invention can be to provide a system and method for detection of anomalies using STL that can return a human-readable STL specification, Yet another object of the present invention can be to provide a system and method for detection of anomalies using STL that can allow the operator to interpret and learn from the returned discriminator, in order to identify patterns of which the operator may have been previously unaware, and that can allow the expert to code into STL and embed into a final discriminator, to allow for an iterative collaboration between the operator and the system. Still another object of the present invention can be to provide a system and method for detection of anomalies using STL which can be easier to implement in a cost-effective manner when compared to its prior art counterparts.

SUMMARY OF THE INVENTION

The present disclosure can describe a system and method pertaining to temporal logic fusion of real-time sensor data. According to an illustrative embodiment, a method can be provided that includes: receiving a plurality of inputs for a plurality of behavior classes, the inputs can include a singleor multi-dimensional state sampled over time, wherein the computing can be performed using dynamic time warping; mapping the high-dimension input signals into a 2-dimensional (2-D) space using t-distributed Stochastic Neighbor Embedding, wherein the pairwise computation is used as the distance metric required to perform this mapping.

The methods and systems can also include the steps of clustering the high-dimension input signals in the 2-D space via a k-means clustering algorithm; generating a signal temporal logic (STL) expression that distinguishes between a cluster in a behavior class and all high-dimension input signals not in that behavior class cluster; and repeating the generating step for each cluster in that behavior class, wherein the resulting STL expressions are selectively combined via an "or" operator in Inference Parametric Signal Temporal Logic (iPSTL) to adjust the false alarm and/or missed detection sensitivity of the STL expression.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

In brief overview, as technology progresses, especially in the field of unmanned vehicles, more and more data is being generated. In the words of former United States Air Force Lieutenant General David A. Deptula, "We are going to find ourselves in the not too distant future swimming in sensors and drowning in data." Indeed, The Department of Defense (DoD) needs to support this data collection can include the need to conduct research in improving the capabilities of our forces to interpret and comprehend the extensive amounts of data that can be collected and presented to the warfighter. The number of people examining and analyzing data may not keep pace with this drastic increase in data generation/collection. As such, the Department of the Navy has recognized the need for automated tools to monitor and analyze collected data, and to process that collected data into a useful form, i.e., into actionable information.

The ability to interpret and comprehend extensive amounts of data is very general, and can apply to a variety of operations and scenarios. While the motivation for this project is to enhance the situational awareness of the warfighter (in a maritime environment or otherwise), a particularly active related research field is that of anomaly detection techniques for computer and network systems, commonly with the aim of identifying intruders and attacks.

In addition to massive amounts of data that can be analyzed for usefulness, the nature of the "usefulness" can change over time, i.e. what was once unimportant can become important and vice versa. To account for change over time, signal temporal logic (STL) can be used. Temporal operators can allow rules to be written requiring that some proposition is always true within a time frame, or that some proposition eventually becomes true within a time frame, or further that some proposition is true until some event occurs. Combining STL operators with propositional logic operators can allow one to succinctly describe behaviors with complex temporal interdependence. Distinguishing between anomalous behavior and normal behavior may include not just what a given entity is currently doing, but also what that entity and other entities have done in the recent past.

Rather than trying to learn a single monolithic temporal expression to distinguish different classes of behaviors, the subject matter of the present disclosure can utilize a clustering-based approach where clusters of similar inputs within each behavior are identified, and a temporal logic expression can be learned to distinguish each cluster from the rest of the inputs within different behavior classes. An expression that successfully discriminates between different classes may be quite complex when using other prior art approaches, but the clustering-based approach may utilize an expression that discriminates between a single cluster and other classes, thus providing a simpler approach that decreases processing time and resources. This is because a variety of basic sub-behaviors may effectively comprise a single behavior for STL analysis purposes, and the combinations of disparate sub-behaviors within a behavior class may lead to increasingly complex descriptions required for the behavior. This in turn may improve the efficiency of learning for the algorithm. Further, the generated expressions for the different clusters may provide additional insight to the end user by providing a better description for the different types of sub-behaviors within a behavior class. Whereas the prior art approaches may focus on distinguishing between two different behavior classes, this approach may handle any number of different behavior classes.

STL can extend the propositional logic used in many of the prior approaches with temporal operators. Another benefit of STL is that it can admit a robustness measure that can determine the degree to which a behavior satisfies a specification. In the domain of anomaly detection, the approach presented herein is novel in that it uses temporal logic specifications learned over sets of clustered inputs to perform identification and prediction of anomalies.

The above approach can be applied in the data analysis chain between sensor and operator. For example, in the JDL Data Fusion Model, the proposed algorithm will operate at level 2, i.e., it can assume there are processes in place that can transform raw sensor data into objects and their attributes to be used by the algorithm, and the result of the algorithm can be a situational assessment.

A first step may be considered the development of a method to learn STL descriptions of normal behavior from historical data. The historical data may be clustered into sets that are best described by some learned STL specification. Heuristically, each cluster may represent one of many disparate behaviors that are considered normal. For example, in a maritime environment such behavior might include docking at a port or traveling along a corridor.

To perform this task requires learning a single STL specification from data. There can be several approaches for establishing parameter ranges for an STL specification over which the historical data matches, as well as determining an optimal set of parameters. Some approaches may require the structure of the specifications to be defined a priori. For example, using an approach for deriving an STL specification that distinguishes between two different sets of data would distinguish between normal and anomalous behaviors. While this is close to what is needed, there are likely to be many data points representing normal behavior in the training data set, and few representing anomalous behavior. Thus, simply finding a description that distinguishes historical normal behaviors from anomalous ones may not accurately describe the normal behavior. Also, new anomalies that are unlike the ones on which the system is trained may be incorrectly classified. A blend of various approaches into a novel approach may be best suited for anomaly detection.

Another step required to complete the learning task can be to cluster the data based on learned STL specifications. As STL specifications admit a measurement of how well a set of data satisfies the specification, this value may be used with a data-clustering algorithm.

Implementation of the trained/learned STL descriptions can involve real-time, online application of the learned STL descriptions to identify and predict anomalies. Identification can include analyzing new data along with historical data over a time horizon, wherein such data may be fed into an automated tool, such as TaLiRo (TaLiRo, or Temporal Logic Robustness, can be a suite of tools by MATLAB® for the analysis of continuous and hybrid dynamical systems using linear time temporal logics) to determine if the new observations continue to satisfy some learned normal behavior, and if not, flag the behavior as anomalous. In the TaLiRo example, an added benefit may be that a measure of satisfaction can also be provided, and this satisfaction may be tracked over time to predict if the observed data is trending towards an anomaly. Other tools could certainly be used.

Expert information about normal and anomalous behaviors in addition to the learned STL specifications may be implemented into the aforementioned system/approach. This may be accomplished at least in part by seeding the learned STL specifications with an expert specification/information before the learning process. In some embodiments, the approach to seeding expert information may be used to incorporate a priori information into the learning step. Another step can be to incorporate the new incoming data to update the learned models online so that gradual shifts in the normal behavior over time can be accounted for.

Examination of manufactured data may be performed by various embodiments. STL specifications for normal behavior can be defined and from these specifications a randomized set of data may be generated for both normal and anomalous behavior. The results of the learning may be compared to the original specifications to determine how closely the results replicated the specifications. The specification(s) may vary in their simplicity/complexity—more noise may be added to the generated set of manufactured data to determine the effect and anticipate the result when applied to real data. The results may be used to identify and fix any deficiencies in the derived approach. Monte Carlo simulations can be used to determine the probability of generating false positives (i.e., identifying an anomaly when one is not present) and false negatives (i.e., failing to identify an anomaly when one is present) relative to the originally defined normal STL specifications. These metrics can be used to assess the adequacy of the system/method.

In addition to examination of manufactured data, various embodiments may collect examples and case studies from the literature on situational awareness and attempt to apply the derived method to them. This may highlight which problems the method is and is not well-equipped to handle and may allow for modifications to improve the approach's general applicability. Further, it can provide a comparison with existing methods and can indicate if and under what conditions it provides an improvement to current capabilities.

Enhanced expressiveness of temporal logics may uncover subtle temporal relationships among normal and anomalous behavior, thereby leading to more accurate descriptions for these behaviors and a higher accuracy at both classifying new behavior as normal or anomalous and predicting future anomalous behavior.

Various embodiments may be operationally relevant to the situation of maritime surveillance. Realistic datasets of maritime data may be utilized including, but not limited to, AIS data from cruise ships. In such an implementation example, behaviors such as loitering (a ship/vessel unnecessarily and with no reason remaining within a confined region of water), shadowing (a ship/vessel staying within a predetermined distance of another vessel), and following geometric patterns of movement/interest (such as a parallel track search or sector search) may be utilized in order to identify behaviors of interest. Such capabilities may enhance maritime situational awareness—monitoring the behavior of a multitude of ships at sea and at port (from large cargo vessels to small dinghies) and anticipating their future actions.

In some embodiments, the system and/or method may be implemented via software (e.g., in PYTHON® using TENSORFLOW®). The software may be able to receive a set of ship tracks as input, each labeled as demonstrating a class of behavior, and then output an STL specification capable of discrimination among different classes of behaviors. This may aid in identifying predefined ship behaviors such as trafficking or terrorism. The software may be able to use any learned or specified STL specifications to identify and/or predict behaviors in near real-time, thus enhancing maritime situational awareness.

The software may be able to receive a set of ship tracks as input, without any labeling, and identify the tracks that are most anomalous relative to the others. This may aid in identifying unanticipated behaviors that should be monitored.

The software may be able to identify descriptions of ship behavior, such as loitering, shadowing, and following a geometric pattern. The ability to identify these higher-level descriptions may help improve the efficacy of the learning algorithm, as such descriptions are strongly correlated with certain behavior of interest. Additionally, the resulting STL specification that is expressed in terms of these higher-level descriptions may be more easily understood by a user/expert. But this is but a manner in which the methods and systems of the present invention could be used. Other uses are certainly possible.

The approach described in the present disclosure may be advantageous as compared to others known in the art, in that the algorithm may return an STL specification that can be understood via feedback to a user (e.g., a human-readable form, audio/visual feedback, haptic feedback, etc.). This can allow a user to verify that the returned discriminator is understood. It can also allow the user to interpret and learn from the returned discriminator, thereby identifying patterns of which he or she may have been previously unaware.

Expert/user knowledge can be encoded into the learning algorithm. If the expert has already learned of several heuristics for discrimination of different behaviors, these can be coded into STL and included as primitives in the learning algorithm, which will allow them to be embedded into the final discriminator. This can allow for an iterative collaboration between user and machine, in which the user codes up his or her knowledge, runs the learning algorithm, then infers new heuristics from the result, and such process may be repeated.

This approach aids information compartmentalization. For security purposes, sometimes a user may only be allowed to see a subset of the available data. Various embodiments, as implemented via software, can be run using all available data while only allowing the user to see a subset of data and/or a final result. This can allow the user to better understand the patterns that are present in the available data without needing to see the entirety of the data. The compartmentalization may be based on various factors pertaining to cybersecurity, operational security, confidentiality, information classification, and user credentials.

A method to learn STL descriptions of normal behavior from historical data may include, e.g.: utilizing a set of simulated ship trajectories in a harbor, with 50 normal trajectories, 25 trajectories representing smuggling activity, and 25 trajectories representing terrorist activity (these percentages are somewhat high but can be used to illustrate the methods). The numbers provided for the aforementioned trajectories are examples, and the numbers may vary depending on the historical data. Incorporation of clustering algorithms into this approach may allow the algorithm to not just learn an STL to distinguish between normal and abnormal behavior, but also to distinguish different types of similar behaviors.

Datasets inputted into the system and/or method may be modified by reducing the sample rates and adding noise to these datasets to make them more representative of operationally relevant data (e.g., ship data used by the military). Next these datasets may be used to characterize the operational effectiveness of the developed algorithm. This modification may be done in several ways, including:

The algorithm can be run over the datasets to identify anomalous tracks. The results may be examined to identify in what way the identified anomalous tracks are indeed anomalous, as well as to determine the extent to which this identification is of operational interest.

The datasets (or a subset, depending on size) may be manually processed to identify behaviors of interest (e.g., redirection of a commercial flight). The datasets may then be split into training and testing sets. The algorithm may be fed the training sets to learn an STL specification, wherein its effectiveness will be measured over the testing set to determine its misclassification rate.

The online runtime performance of the algorithm may be characterized for each derived specification in the previous two tasks. The datasets may be fed into the algorithm in simulated real-time with the following considerations:

How effectively does the algorithm identify and predict the specified behavior as the tracks are being observed? This will consider not just the misclassification rate, but also how the prediction of the behavior and the algorithm's confidence in the prediction vary over the observation of the tracks. This will also consider how much time is required to achieve a reliable prediction of behavior.

How computationally intensive is the algorithm? In some embodiments (e.g., those using TENSORFLOW®), the algorithm may be deployed to both Central Processing Unit (CPU) and Graphics Processing Unit (GPU) devices for testing. This consideration will analyze the number of tracks and their sample rates to identify the data throughput, as well as compare this throughput to the CPU/GPU utilization and specifications.

As the aforementioned modification tasks are performed, deficiencies may be iteratively identified and corrected to maximize the effectiveness of the algorithm implemented in the system and/or method.

The algorithm of the present invention according to several embodiments may also be modified to identify common low-level behaviors of interest (e.g., in a maritime environment wherein such behaviors may include loitering, shadowing, and geometric patterns of interest). These behaviors may then be included as additional building blocks to be used by the learning algorithm for identifying anomalies and behaviors of interest.

Implementation of the system and/or method (via CPU testing) can be performed on a computer workstation, and a machine/workstation with a GPU (e.g., a Linux-based machine with a TESLA® GPU) can be utilized for GPU testing.

Figure 1:
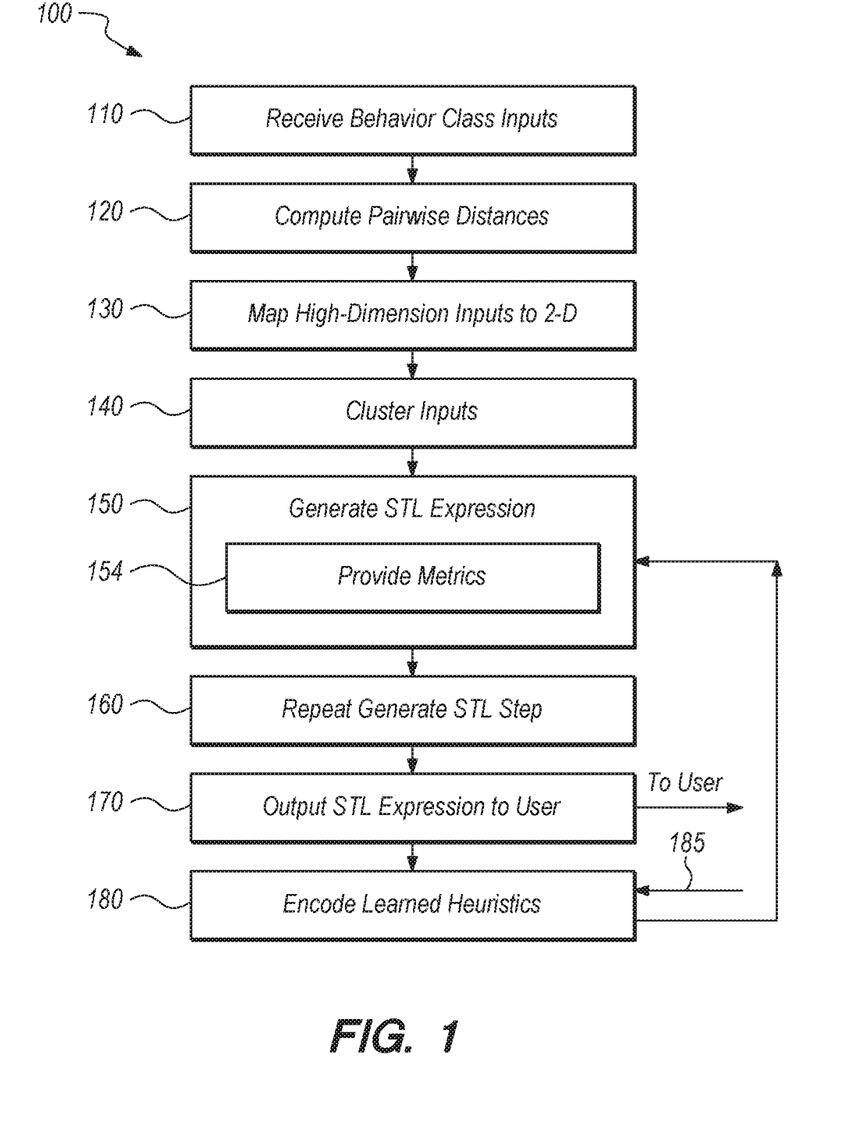
FIG. 1 is a flowchart of an embodiment of a method in accordance with the subject matter of the present disclosure; and, FIG. 2 is a block diagram of an embodiment of a system in accordance with the subject matter of the present disclosure.

Keeping the above in mind, and referring now to FIG. 1, FIG. 1 shows a flowchart of an embodiment of a method 100 in accordance with the subject matter of the present disclosure. Method 100 may be implemented as a series of modules, and the modules may function in concert with physical electronic and computer hardware devices. Such modules may be utilized separately and/or together, locally and/or remotely, to form a program product thereof, which may be implemented through recordable media. Some or all of the steps of method 100 may be stored within non-transitory computer-readable media, wherein the steps are represented by computer-readable programming code. For illustrative purposes, method 100 may be discussed with reference to FIG. 2. Additionally, while FIG. 1 shows an embodiment of method 100, other embodiments of method 100 may contain fewer or additional steps. Although in some embodiments the steps of method 100 may be performed as shown in FIG. 1, in other embodiments the steps may be performed in a different order, or certain steps may occur simultaneously with one or more other steps.

Step 110 can include receiving a plurality of inputs for a plurality of behavior classes, the inputs can include a single- or multi-dimensional state sampled over time.

Step 120 can include computing the distance parameter pairwise with the time parameter within a behavior class, wherein the computing can be performed using dynamic time warping. A similarity metric may be computed between the distance parameter and the time parameter such that one of the two parameters is capable of being sped-up, sloweddown, or shifted in time relative to the other of the two parameters without decreasing the computed similarity between the two parameters.

Step 130 includes mapping the high-dimensional input signals into a 2-dimensional (2-D) space using t-distributed Stochastic Neighbor Embedding, wherein the pairwise computation is used as the distance metric required to perform this mapping. Step 130 converts the high-dimension input space to 2 D space such that input signals that are close in the high-dimension input with respect to the distance metric computed in step 120 can remain close in the2-D space with high probability, and such that input signals that are far apart in the high-dimension input space with respect to the distance metric remain far apart in the 2-D space with high probability.

Step 140 includes clustering the high-dimension input signals in the 2-D space via a k-means clustering algorithm.

Step 150 includes generating a signal temporal logic (STL) expression that distinguishes between a cluster in a behavior class and all high-dimension input signals not in that behavior class. In some embodiments. Examples of propositional logic include: "and," "not," etc. Examples of temporal operators include: "always," "eventually," "until," etc. An example of an STL specification for maritime surveillance may include descriptive language such as: "a ship that arrives in a port remains at the port until unloaded within 5 hours, after which it eventually departs within the following 2 hours." In some embodiments, sub-step 154 may include providing a metric describing satisfaction of the STL specification, for example: (i) "a ship that unloads within 2 hours and leaves after an hour strongly satisfies the specification," and (ii) "a ship that takes 4.75 hours to unload and leaves immediately weakly satisfies the specification." As previously discussed for a maritime environment, behaviors for loitering, shadowing, and following a geometric pattern may be utilized as part of the STL expression. Methods of generating an STL expression can be found in the paper by Zhaodan Kong, et al., entitled "Temporal Logics for Learning and Detection of Anomalous Behavior". The contents of the Kong paper are hereby incorporated by reference herein. Other methods for generating an STL expression are certainly possible.

Step 160 can include repeating the generating step for each cluster in that behavior class, together with the high order expressions that are not in the cluster under consideration, to result in an enhanced STL expression. The resulting STL expressions can be combined via an "or" operator in Inference Parametric Signal Temporal Logic (iPSTL), depending on whether the expression yields an undesirable amount of missed detections ("and") or false positives ("or").

The generating step and the repeating step are repeated for each behavior class to generate an STL expression to identify whether a given input signal belongs to a given behavior class.

Step 170 includes outputting feedback to a user by providing an STL specification that allows the user to interpret and identify patterns in data upon which the feedback is based, wherein the STL specification is provided in at least one of a human-readable format, an audio format, a visual format, and a haptic format. Outputting feedback may include outputting compartmentalized information such that the feedback is only a subset of data that is available for output to the user, wherein the compartmentalized information aids the user in understanding the patterns present in the subset of data without receiving the entirety of the data.

Step 180 can include encoding learned heuristics for discrimination of behaviors into the STL expression, wherein the encoding allows for an iterative inference of new heuristics based on a result of the encoded STL expression. To do this, learned heuristics can be encoded and fed from step 180 into step 150 in the form of additional STL basis expressions. A human operator may be able to infer new heuristics from the output of this system, and encode these and feed them into step 150. That is step 180 should feed into step 150, and should also take in external heuristics (represented by arrow 185, See FIG. 1) and/or the outputs from step 170.

Figure 2:
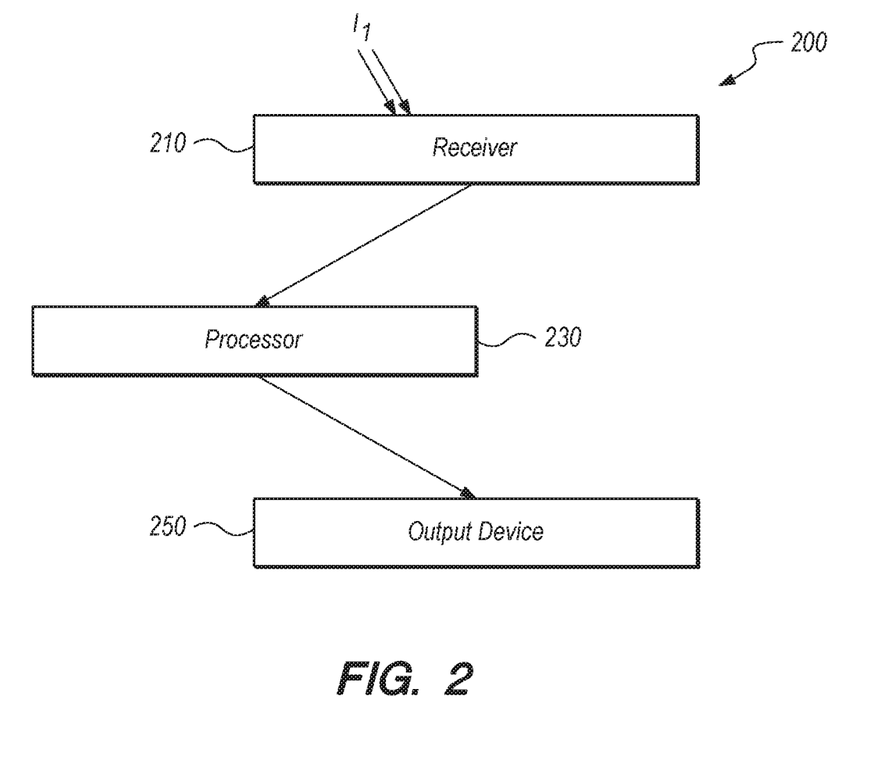

FIG. 2 can be a block diagram of a system 200 that can include a receiver 210 configured to receive a plurality of inputs for a plurality of behavior classes, the inputs can include a single- or multi-dimensional state sampled over time.

A processor 230 is operatively connected to receiver 210 and is configured to: compute a distance metric pairwise among the inputs as per comments for [0009], wherein the computing is performed using dynamic time warping; map the high-dimension input signals into a 2-dimensional (2-D) space using t-distributed Stochastic Neighbor Embedding, wherein the pairwise computation is used as the distance metric required to perform this mapping; cluster the high-dimension input signals in the 2-D space via a k-means clustering algorithm; generate a signal temporal logic (STL) expression that distinguishes between a cluster in a behavior class and all high-dimension input signals not in that behavior class; and repeat the generating of an STL expression for each cluster in that behavior class, wherein the resulting STL expressions are combined via an "or" operator in Inference Parametric Signal Temporal Logic (iPSTL). For each behavior class, the generate function and the repeat function of processor 230 are repeated in order to generate an STL expression to identify whether a given input signal belongs to a given behavior class.

The mapping function of processor 230 can convert the high-dimension input space to 2-D space such that input signals that are close in the high-dimension input space with respect to the distance metric computed in step 120 remain close in the 2-D space with high probability, and such that input signals that are far apart in the high-dimension input space with respect to the distance metric remain far apart in the 2-D space with high probability.

As part of the generate function, processor 230 may also provide a metric describing satisfaction of the STL specification. In some embodiments, learned heuristics may be encoded into the STL expression for discrimination of behaviors, wherein the encoding allows for an iterative inference of new heuristics based on a result of the encoded STL expression.

An output device 250 is operatively connected to processor 230 and is configured to output feedback to a user by providing an STL specification that allows the user to interpret and identify patterns in data upon which the feedback is based, wherein the STL specification is provided in at least one of a human-readable format, an audio format, a visual format, and a haptic format.

In some embodiments, output device 250 may provide compartmentalized information as feedback such that the feedback is only a subset of data that is available for output to the user, wherein the compartmentalized information aids the user in understanding the patterns present in the subset of data without receiving the entirety of the data.

From the above, it can be seen that systems and methods, and software for performing the methods, can take in a set of ship tracks, each labeled as demonstrating some class of behavior, and then output a Signal Temporal Logic (STL) specification that is capable of discrimination among the different classes of behaviors. This can be useful for identifying predefined ship behaviors such as trafficking or terrorism. The systems and methods according to several embodiments can take in a set of ship tracks, without any labeling, and identify the tracks that are most anomalous relative to the others. This is useful for identifying unanticipated behaviors that are worth monitoring.

Still further, the systems and methods of several embodiments, can identify higher-level descriptions of the ship behavior, such as loitering (remaining unnecessarily within some confined region of water for no apparent reason), shadowing (staying within some distance of another ship), and following a geometric pattern such as a parallel track search. Being able to identify these higher-level descriptions will help improve the efficacy of the learning algorithm, as they are strongly correlated with certain behavior of interest, as well as making the resulting STL specification that is expressed in terms of these higher-level descriptions more readable. The systems and methods will be able to use any learned or specified STL specifications to identify and/or predict behaviors in near real-time, thus enhancing maritime situational awareness.

One benefit of this approach described herein when compared to others can be that the algorithm returns a human-readable STL specification. This can allow an operator to verify that the returned discriminator makes sense, and also allows the operator interpret and learn from the returned discriminator, identifying patterns of which he or she may have been unaware. Another benefit can be that expert knowledge can be encoded into the learning algorithm. If the operator has already learned of several heuristics for discrimination different behaviors, these can be coded into STL and included as primitives in the learning algorithm, which will allow them to be embedded into the final discriminator. This can allow for an iterative collaboration between operator and machine, in which the operator codes up his or her knowledge, runs the learning algorithm, then infers new heuristics from the result, and repeats. Another further benefit can be that the approach as described herein can aid information compartmentalization. There may be situations where an operator is only allowed to see a subset of the available data for security purposes. It is conceivable that the systems and methods can be run over all available data while only allowing the operator to see the final result. This can allow the operator to better understand the patterns that are present in the available data without needing to see the entirety of the data.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method comprising:
   receiving a plurality of inputs for a plurality of behavior classes, the inputs selected from the group consisting of single- or multi-dimensional states sampled over time;
   computing the distance parameter pairwise among the inputs, wherein the computing is performed using dynamic time warping;
   mapping the high-dimension input signals into a 2-dimensional (2-D) space using t-distributed Stochastic Neighbor Embedding, wherein the pairwise computation is used as a distance metric required to perform said mapping for each said behavior class, respectively;
   clustering the high-dimension input signals in the 2-D space via a k-means clustering algorithm;
   generating a signal temporal logic (STL) expression that distinguishes between a cluster in a behavior class and all high-dimension input signals not in that behavior class; and
   repeating the generating step for each cluster in that behavior class, wherein the resulting STL expressions are combined via an "or" operator in Inference Parametric Signal Temporal Logic (iPSTL).

2. The method of claim 1, wherein a similarity metric is computed between inputs such that one of the two said inputs is capable of being sped-up, slowed-down, or shifted in time relative to the other of the two parameters without decreasing the computed similarity between the two parameters.

3. The method of claim 1, wherein the generating step and the repeating step are repeated for each behavior class to generate an STL expression to identify whether a given input signal belongs to a given behavior class.

4. The method of claim 3, further comprising:
   outputting feedback to a user by providing an STL specification that allows the user to interpret and identify patterns in data upon which the feedback is based, wherein the STL specification is provided in at least one of a human-readable format, an audio format, a visual format, and a haptic format.

5. The method of claim 4, wherein the outputting step includes outputting compartmentalized information such that the feedback is only a subset of data that is available for output to the user, wherein the compartmentalized information aids the user in understanding the patterns present in the subset of data without receiving the entirety of the data.

6. The method of claim 3, further comprising:
   encoding learned heuristics for discrimination of behaviors into the STL expression, wherein the encoding allows for an iterative inference of new heuristics based on a result of the encoded STL expression.

7. The method of claim 3, wherein for a maritime environment, behaviors for loitering, shadowing, and following a geometric pattern are utilized as part of the STL expression.

8. The method of claim 1, wherein said mapping step converts said high-dimension input space to said 2-D space such that said input signals that are close in said high-dimension input space with respect to said distance metric remain close in said 2-D space with high probability, and such that said input signals that are far apart in said high-dimension input space with respect to said distance metric remain far apart in said 2-D space with high probability.

9. The method of claim 1, wherein the generating step further comprises:
   providing a metric describing satisfaction of the STL specification.

10. A system comprising:
    a receiver configured to receive a plurality of inputs for a plurality of behavior classes, the inputs selected from the group consisting of single- or multi-dimensional states sampled over time;

a computer hardware device having a processor operatively connected to the receiver and configured to:
  compute a distance metric pairwise among said inputs, wherein the computing is performed using dynamic time warping,
  map the parameters as high-dimension input signals into a 2-dimensional (2-D) space using t-distributed Stochastic Neighbor Embedding, wherein the pairwise computation is used as the distance required to perform said mapping,
  cluster the high-dimension input signals in the 2-D space via a k-means clustering algorithm,
  generate a signal temporal logic (STL) expression that distinguishes between a cluster in a behavior class and all high-dimension input signals not in that behavior class, and
  repeat the generating of an STL expression for each cluster in that behavior class, wherein the resulting STL expressions are combined via an "or" operator in Inference Parametric Signal Temporal Logic (iP-STL), and wherein for each behavior class the generate function and the repeat function of the processor are repeated in order to generate an STL expression to identify whether a given input signal belongs to a given behavior class; and
an output device operatively connected to the processor and configured to output feedback to a user by providing an STL specification that allows the user to interpret and identify patterns in data upon which the feedback is based, wherein the STL specification is provided in at least one of a human-readable format, an audio format, a visual format, and a haptic format.

11. The system of claim 10, wherein a similarity metric is computed between said inputs such that one of two said inputs is capable of being sped-up, slowed-down, or shifted in time relative to the other of the two parameters without decreasing the computed similarity between the two parameters.

12. The system of claim 10, wherein the mapping function of the processor converts said high-dimension input space to said 2-D space such that said input signals that are close in said high-dimension input space with respect to said distance metric remain close in said 2-D space with high probability, and such that said input signals that are far apart in said high-dimension input space with respect to said distance metric remain far apart in said 2-D space with high probability.

13. The system of claim 10, wherein learned heuristics are encoded into the STL expression for discrimination of behaviors, wherein the encoding allows for an iterative inference of new heuristics based on a result of the encoded STL expression.

14. The system of claim 10, wherein the output device provides compartmentalized information as feedback such that the feedback is only a subset of data that is available for output to the user, wherein the compartmentalized information aids the user in understanding the patterns present in the subset of data without receiving the entirety of the data.

15. The system of claim 10, wherein the processor is further configured to, as part of the generate function, provide a metric describing satisfaction of the STL specification.

* * * * *